(12) United States Patent
Law et al.

(10) Patent No.: US 8,736,621 B2
(45) Date of Patent: May 27, 2014

(54) SYSTEM AND METHOD FOR CONFIGURING A DISPLAY PIPELINE

(71) Applicant: Broadcom Corporation, Irvine, CA (US)

(72) Inventors: Patrick Law, Milpitas, CA (US);
Darren Neuman, San Jose, CA (US);
David Baer, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/076,813

(22) Filed: Nov. 11, 2013

(65) Prior Publication Data
US 2014/0078158 A1 Mar. 20, 2014

Related U.S. Application Data

(63) Continuation of application No. 13/568,588, filed on Aug. 7, 2012, now Pat. No. 8,581,915, which is a continuation of application No. 10/314,525, filed on Dec. 9, 2002, now Pat. No. 8,259,121.

(60) Provisional application No. 60/420,151, filed on Oct. 22, 2002.

(51) Int. Cl.
*G06T 1/20* (2006.01)
*G06F 12/02* (2006.01)
*G06K 9/60* (2006.01)

(52) U.S. Cl.
USPC ............ 345/506; 345/567; 382/303; 382/304

(58) Field of Classification Search
USPC .......... 345/501, 502, 505, 506, 567; 382/303, 382/304; 710/22, 29
See application file for complete search history.

(56) References Cited

U.S. PATENT DOCUMENTS

| | | | |
|---|---|---|---|
| 5,638,533 A | 6/1997 | Law | |
| 5,646,693 A | 7/1997 | Cismas | |
| 5,822,779 A | 10/1998 | Intrater et al. | |
| 5,828,903 A | 10/1998 | Sethuram et al. | |
| 5,841,439 A | 11/1998 | Pose et al. | |
| 5,987,246 A | 11/1999 | Thomsen et al. | |
| 6,101,591 A | 8/2000 | Foster et al. | |
| 6,412,061 B1 | 6/2002 | Dye | |
| 6,429,902 B1 | 8/2002 | Har-Chen et al. | |

(Continued)

FOREIGN PATENT DOCUMENTS

| | | |
|---|---|---|
| EP | 1091318 A2 | 4/2001 |
| WO | WO99/13637 A2 | 3/1999 |
| WO | WO99/52277 A1 | 10/1999 |
| WO | WO01/22736 A1 | 3/2001 |

OTHER PUBLICATIONS

European Patent Office, Communication with European Search Report, in Application No. 03023968.5, dated Oct. 1, 2010, pp. 1-3.

*Primary Examiner* — Hoang-Vu A Nguyen-Ba
(74) *Attorney, Agent, or Firm* — Foley & Lardner LLP

(57) ABSTRACT

Systems and methods are disclosed for video processing modules. More specifically a network is disclosed for processing data. The network comprises a register DMA controller adapted to support register access and at least one node adapted to the data. At least one link communicates with the node, and is adapted to transmit data and at least one network module communicates with at least the link, and is adapted to route data to at least the link.

20 Claims, 11 Drawing Sheets

(56) References Cited

U.S. PATENT DOCUMENTS

| | | |
|---|---|---|
| 6,489,953 B1 | 12/2002 | Chen |
| 6,525,738 B1 | 2/2003 | Devins et al. |
| 6,628,243 B1 | 9/2003 | Lyons et al. |
| 6,636,214 B1 | 10/2003 | Leather et al. |
| 6,700,588 B1 | 3/2004 | MacInnis et al. |
| 6,801,591 B1 | 10/2004 | Frencken |
| 6,919,896 B2 | 7/2005 | Sasaki et al. |
| 7,034,828 B1 | 4/2006 | Drebin et al. |
| 7,054,867 B2 | 5/2006 | Bosley et al. |
| 7,218,676 B2 | 5/2007 | Kono et al. |
| 7,230,651 B2 | 6/2007 | Schoner et al. |
| 8,259,121 B2 | 9/2012 | Law et al. |
| 2002/0066007 A1 | 5/2002 | Wise et al. |
| 2003/0080963 A1 | 5/2003 | Van Hook et al. |
| 2003/0146857 A9 | 8/2003 | Koike |
| 2004/0078418 A1 | 4/2004 | Law et al. |
| 2005/0114569 A1 | 5/2005 | Bogin et al. |
| 2013/0033505 A1 | 2/2013 | Law et al. |

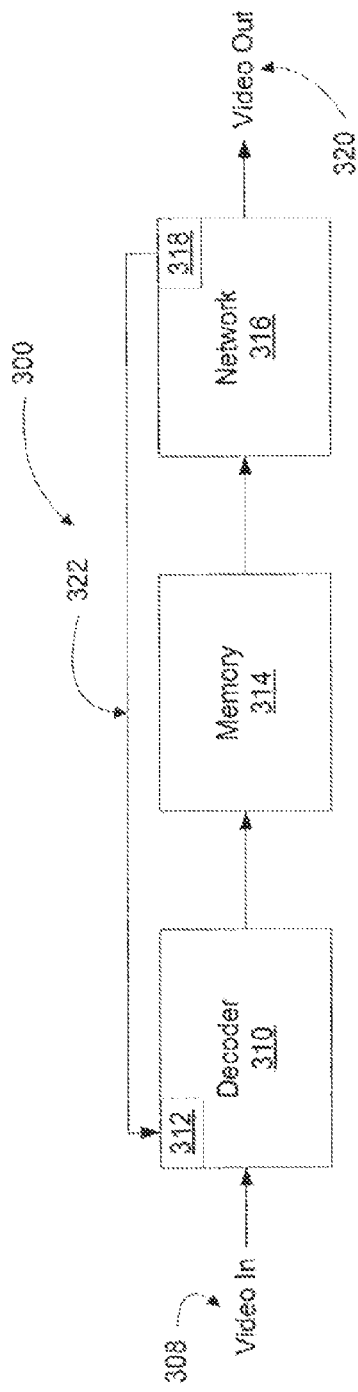
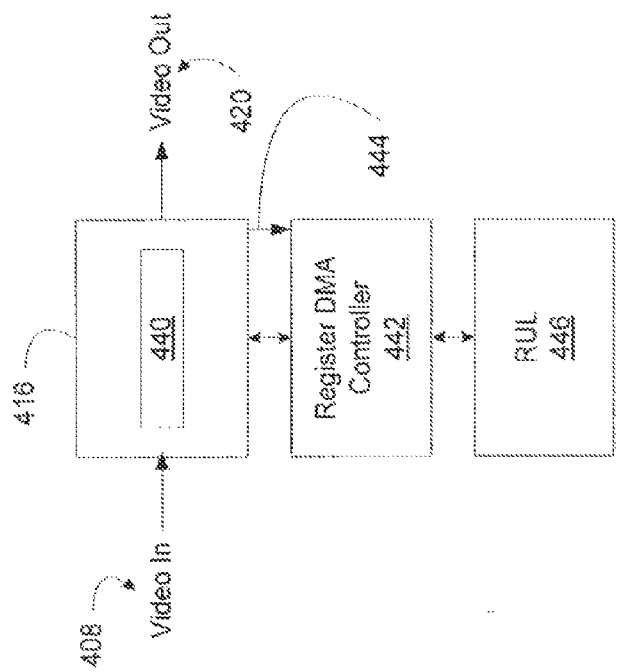

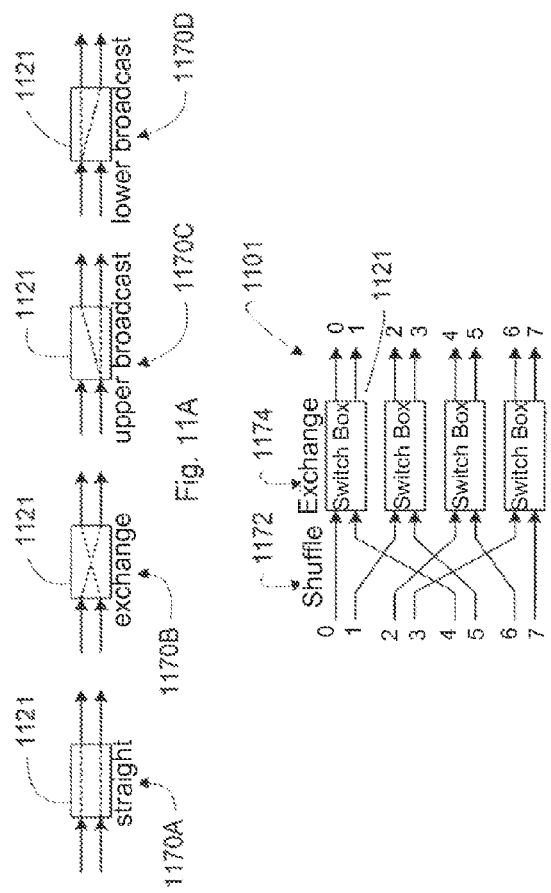
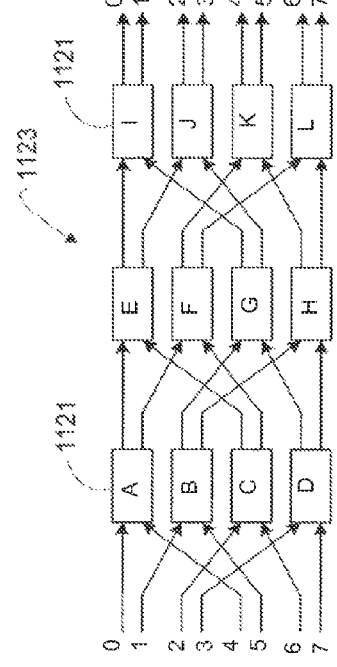
Fig. 11A
Fig. 11B
Fig. 11C

SYSTEM AND METHOD FOR CONFIGURING A DISPLAY PIPELINE

CROSS-REFERENCE TO RELATED APPLICATIONS

This application is a continuation of U.S. patent application Ser. No. 13/568,588 filed Aug. 7, 2012 which is a continuation of U.S. patent application Ser. No. 10/314,525 filed Dec. 9, 2002 which is related to, and claims benefit of and priority from, Provisional Application No. 60/420,151 dated Oct. 22, 2002, titled "Network Environment for Video Processing Modules", the complete subject matter of which are each incorporated herein by reference in its entirety. This application is also related to the following applications, each of which is incorporated herein by reference in its entirety for all purposes: U.S. patent application Ser. No. 10/300,371, filed Nov. 20, 2002, titled "A/V Decoder Having A Clocking Scheme That Is Independent Of Input Data Streams"; U.S. Provisional Application No. 60/420,347, filed Oct. 22, 2002, titled "Video Bus For a Video Decoding System"; U.S. patent application Ser. No. 10/300,370, filed Nov. 20, 2002, titled "Hardware Assisted Format Change Mechanism in a Display Controller"; U.S. patent application Ser. No. 10/114,798, filed Apr. 1, 2002, titled "Video Decoding System Supporting Multiple Standards"; and U.S. Provisional Application No. 60/420,308, filed Oct. 22, 2002, titled "Multi-Pass System and Method Supporting Multiple Streams of Video".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to a network adapted to process data. More specifically, the present invention relates to a network environment in an A/V system using "A/V decoders", where the A/V decoders are adapted to process, decode or decompress one or more input data streams (alternatively referred to as "input data", "input data streams" or "data streams").

There is currently no known methodological way to connect video processing modules in A/V systems. Most video processing modules are connected together in an ad-hoc manner. As a result, such ad-hoc designs may become difficult to verify, maintain and reuse. Furthermore, as more features are added to the A/V systems (i.e., incorporating more video processing modules for example) it becomes more difficult to design and integrate such features properly. This may result in long development cycles, poor design reuse and an unreliable product.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

There is a need for an architecture or network that provides a general model illustrating how various video processing modules behaves in a network environment Further, an exemplary embodiment of such network should reduce the number of clock domains, ease design reuse and perform format changes in a robust manner.

Features of the present invention may be found in a network environment in an A/V system and method supporting a pull data flow scheme for an A/V decoder. The network is adapted to video process modules using a pull data flow (an output rate driven by data flow for example).

One embodiment of the present invention relates to a network for processing data to form at least one display pipeline therein by selecting and concatenating at least two nodes from a plurality of nodes in the network together. It is contemplated that this selection and concatenation happens on the fly (i.e., in real time). In this embodiment, the network is further adapted to form a plurality of the same or different display pipelines using at least the two nodes. It is contemplated that the network may change the functionality of the display pipeline by concatenating more than two nodes together. In one embodiment, the network is adapted to form at least two display pipelines having different and/or independent data rates (using a flow control valve or module for example). It is further contemplated that such network is adapted to form at least two of the display pipelines using a handshaking or ready/accept protocol.

In another embodiment, the network comprises at least a register DMA controller adapted to support register access. The register DMA controller is further adapted to obtain at least one instruction from a register update list and provide that instruction to the display pipeline. It is further contemplated that the register DMA controller may obtain the instruction in response to a trigger event.

Yet another embodiment of the present invention relates to a network for processing data. In this embodiment, the network comprises a register DMA controller adapted to support register access and a plurality of nodes adapted to process the data. The network further comprises at least one link communicating with the nodes and adapted to transmit the data between the nodes, and at least one network module communicating with at least the link and adapted to route the data thereto, wherein the network is adapted to form at least one display pipeline therein by selecting and concatenating at least two nodes from the plurality of nodes.

Another embodiment of the present invention relates to a method of processing data using a network. In this embodiment, the network comprises forming a first display pipeline using at least one node in the network and processing the data using the first display pipeline. The method further comprises forming a second display pipeline using at least one node in the network and processing the data using the second display pipeline, where the first and second display pipelines are different.

Still another embodiment of the present invention relates to a method of processing data using a network. In this embodiment, the network comprises forming a display pipeline by selecting and concatenating at least two nodes from a plurality of nodes in the network on the fly (i.e., in real time) and processing the data using the display pipeline.

Another embodiment of the present invention relates to a method of programming an A/V system using a network. In this embodiment, the network comprises generating at least one trigger at an end of a first picture and obtaining at least one register update list from a main memory. The network notifies a decoder about the end of the first picture and configures at least one node in the network for a second picture. The network enables the at least one node, obtains the second picture from a frame buffer, and provides the second picture to a display pipeline in the network.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 illustrates one embodiment of a block diagram of an A/V system having a network in accordance with the present invention;

FIG. 4 illustrates another embodiment of a block diagram of an A/V system having a network in accordance with the present invention;

FIGS. 11A, 11B, 11C, 11D, 11E, 11F and 11G illustrate embodiments of switched used in a network module in accordance with one embodiment of the present invention;

DETAILED DESCRIPTION OF THE INVENTION

The following description is made with reference to the appended figures.

Figure 1:
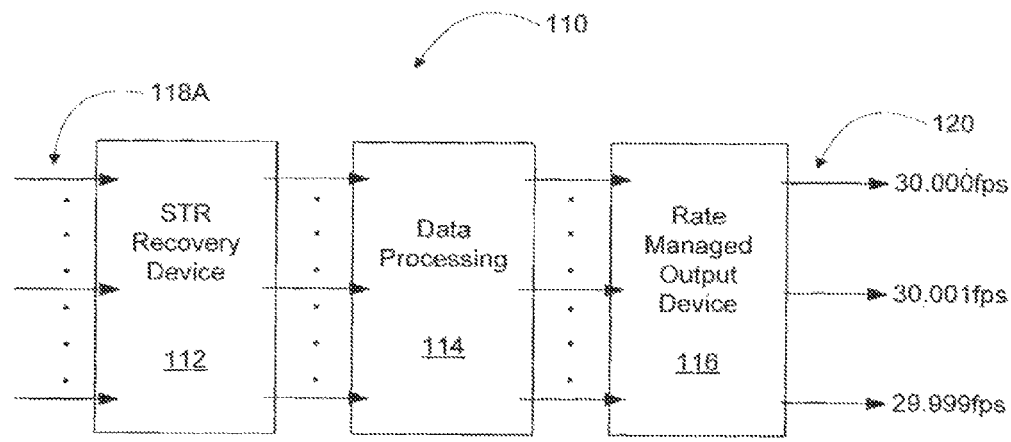
FIG. 1 illustrates one embodiment of a block diagram of an A/V decoder in accordance with the present invention.
Figure 2:
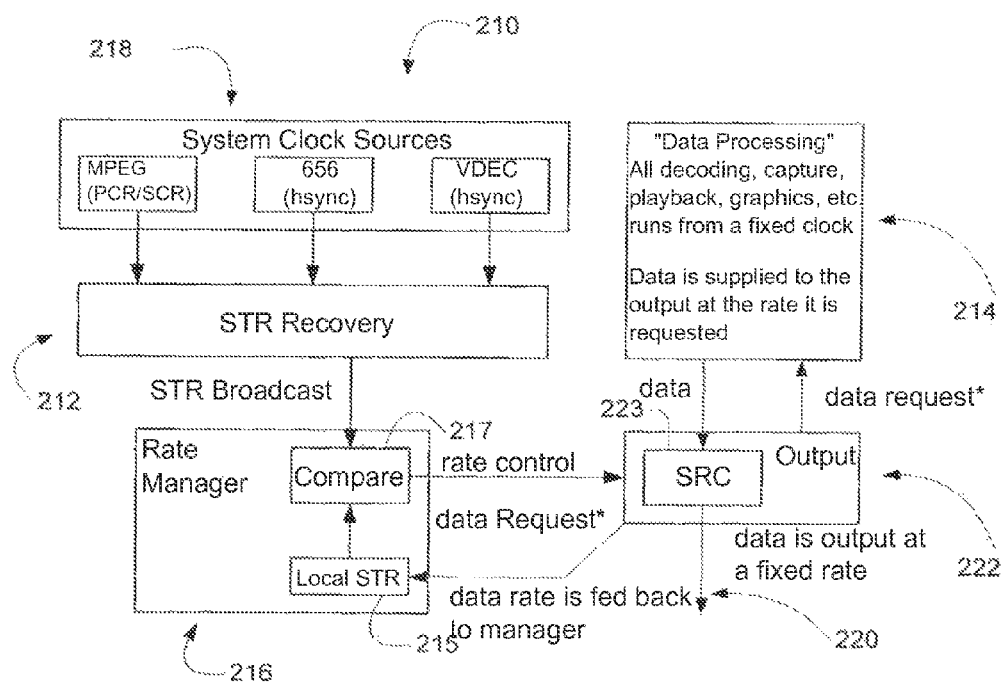
FIG. 2 illustrates another embodiment of a block diagram of an A/V decoder in accordance with the present invention.

One embodiment of the present invention relates to a network environment. More specifically, one embodiment relates to a network environment in an A/V decoder device that decodes one or more input data streams with multiple output rates using a single clock reference. This embodiment enables video processing modules having multiple time bases to be implemented using a single clock reference (alternatively referred to as a "system clock"). FIGS. 1 and 2 illustrate block diagrams of embodiments of an A/V decoders in accordance with the present invention.

FIG. 1 illustrates one embodiment of a high level block diagram of an embodiment of an A/V decoder, generally designated 110. More detail about the A/V decoder is provided in U.S. patent application Ser. No. 10/300,371 filed Nov. 20, 2002, titled "A/V Decoder Having A Clocking Scheme That Is Independent Of Input Data Streams", the complete subject matter of which is incorporated herein by reference in its entirety. In the illustrated embodiment, the decoder 110 comprises a system time reference recovery device 112 (alternatively referred to as an "STR recovery device") having one or more input data streams 118.

The STR recovery device 112 is illustrated communicating with an A/V data processing device 114. In one embodiment of the invention, STR refers to a reference time value. It is anticipated that different or more complex systems are also possible and within the scope of the present invention. For example if the A/V decoder 110 has more than one data source, the decoder may include more than one STR recovery device, where the number of STR recovery devices may or may not correspond to the number of data sources.

As an alternative to the MPEG scheme, an A/V system incorporating an A/V decoder may accept analog television signals as inputs. In this embodiment, the analog video input goes through, and is processed or decoded by, the A/V data processing device 114, which may comprise a video decoder or VDEC. Likewise, analog audio goes through, and is processed or decoded by, the A/V data processing device 114 which may further comprise a BTSC audio decoder (alternatively referred to as a "ADEC" or "BTSC").

One embodiment of the present invention uses a system clock (a fixed system clock for example) to control the data processing. More specifically, the system clock may be used to control the data process in a network in accordance with the present invention. It is contemplated that the STR recovery device 112 may be locked to the analog video line rate. The analog hysncs are converted into a psuedo-STR using a simple counter in one embodiment. The STR recovery device 112 locks to this psuedo-STR and broadcasts the recovered STR to the rest of the decoder 110. The broadcast STR is used to control the output rates as provided previously.

FIG. 1 further illustrates a rate managed output device 116, which is illustrated as communicating with the data processing device 114. In the illustrated embodiment, the rate managed output device 116 has one or more A/V outputs 120, which are output at the same or different rates. In FIG. 1, three A/V outputs, generally designated 120, are illustrated. For example, one A/V output is output at 29.999 frames per second (alternatively referred to as "fps"), one is output at 30.001 fps and one is output at 30.000 fps.

In one embodiment, the A/V data processing device 114 includes a network environment for video processing modules. The data processing device 114 bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that such architecture may be made orthogonal, and easy to control.

In accordance with one embodiment, all data, including all audio and video data, is processed by a network environment and transferred using a "pull" model or mode, even though typical A/V streams (e.g., MPEG) are adapted to operate according to a push model or mode. The outputs request data as needed. Each module in the A/V decoder 110 may supply data to its outputs at the rate it is requested. Because a pull model or mode is used, the data processing clock (i.e., the system clock) is not tied to the input data rate. For example, the audio decoder may be clocked at 243 MHz, 133 MHz, or any other reasonable rate. The audio decoder clock does not need to "track" the input data rate.

Conventional A/V decoders use a VCXO or VCXO-PLL to lock the chip clock to the input data rate. However, one embodiment of the present invention uses rate managed output devices 116 and the associated SRC devices to change or adjust the video and audio output rates.

It is contemplated that, in one embodiment of the present invention, the output data rate tracks the STR. If the A/V decoder decodes multiple video streams, there may be multiple STRs. Each output data rate tracks an associated STR. The process of controlling the output rates may be called "rate management." In one embodiment, the rate managed output device 116 (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment, the A/V decoder may include several output rate managers, one for each output of the A/V decoder. More detail about rate managers is provided in U.S. Provisional Application No. 60/420,344 filed Oct. 22, 2002, titled "Data Rate Management System and Method for A/V Decoder".

FIG. 2 illustrates another embodiment of a block diagram of an A/V decoder, generally designated 210, in accordance with one embodiment of the present invention. In the illustrated embodiment, the decoder 210 comprises an STR recovery device 212 having one or more input data streams 218 and a STR broadcast output.

In the illustrated embodiment, the input data streams (alternatively referred to as "system clock sources" or "system reference sources") 218 comprise an MPEG (PCR/SCR) stream, a 656 (hysnc) stream and a VDEC (hysnc) stream. While three input streams are illustrated, more complex systems, having more or different input data streams are contemplated. In the illustrated embodiment, the input time references are MPEG PCR/SCR values. However, for analog video or ITU656 video inputs, the hsync timing may be used as the time reference or a fixed timing reference may be used for PVR playback.

The STR recovery device 212 is illustrated as communicating (indirectly in this embodiment) with a data processing device 214. In one embodiment, the SRT recovery device 212 controls the output data rates (in conjunction with a rate managed output and SRC devices). The data processing device 214 is adapted to decode, capture, play back and produce graphics, etc. from the data inputs (i.e., the input data streams 218) using a fixed clock or timing reference. That is the data processing devices may decode, capture, play back and produce graphics, etc. using a fixed clock (i.e., the system clock for example). In one embodiment, the data is supplied to an output device or buffer 22 as requested (i.e., the output device requests data from the data processing device or the data is "pulled"). It is contemplated that, in one embodiment, the data processing device 214 comprises or includes a network environment for video processing modules in accordance with the present invention.

A rate managed output device 216 is illustrated as communicating (indirectly in this embodiment) with at least the data processing device 214. More specifically, the rate managed output device 216 communicates with the STR recovery device 212 and the output device 222. In the illustrated embodiment, the rate managed output device 216 comprises at least local STR and compare devices 215 and 217 respectively, while the output device 222 comprises at least an SRC device 223.

In one embodiment, the output device 222 outputs data 220 at a fixed clock rate (i.e., the system clock rate) as it is requested. The output device 222 submits data requests to the data processing device 214, and thus pulls the data. The data request is also submitted or mirrored to the rate managed output device 216, where it is compared with the STR broadcast in the compare module 217. A rate control signal is communicated to the output device 222 (specifically the SRC device 223), ensuring that the data 220 is output at the fixed clock rate, and the output data rate matches the input data rate. The digital sample rate converter converts data from an input sample rate to an output sample rate. In one embodiment, the output sample rate may differ from the input sample rate. By adjusting the SRC parameters, the rate managed output device 216B changes the rate of the sample rate at the input of the SRC device 223B. This change to the sample rate changes the rate the data is requested from the data processing device 214B.

FIG. 3 illustrates one embodiment of a block diagram of an A/V system, generally designated 300, having a network in accordance with the present invention. It is contemplated that the illustrated A/V system may be similar to those A/V systems provided previously. It is also contemplated that the network may be used in different systems. In this embodiment, system 300 includes a decoder 310 (an MPEG decoder for example) adapted to receive video inputs or data 308. In this embodiment, the decoder 310 includes one or more STR recovery devices 312, used, with the system clock (a fixed system clock for example) to control the data processing similar to that provided previously. However, other decoders, with or without STR recovery devices are contemplated.

A memory or frame buffer 314 is illustrated coupled to the decoder 310 and receives data therefrom. The memory 314 is shown coupled to network 316 as illustrated, which is adapted to transport and process video or data, outputting video out or data 320. In one embodiment, the network 316 is adapted to support a pull data flow. The network 316 includes one or more counters 318 (coupled to the STR recovery device via feedback loop 322) that, along with the rate managed output device (not shown) control the data rate of the output.

FIG. 4 illustrates one embodiment of a block diagram of a network, similar to the network 316 of FIG. 3 in accordance with the present invention. In this embodiment, the network 416 is adapted to receive video-in 408 (from a memory for example) and output video out 420.

FIG. 4 further illustrates at least one display pipeline 440 inside the network 416. In one embodiment of the present invention, the display pipeline 440 is changeably formed by chaining, coupling or concatenating one or more network nodes together, depending on the network requirements, on the fly (i.e., in real time). It is contemplated that the nodes may be re-configured, so that a plurality of display pipelines 440 may be formed, each pipeline having different functionality depending on the nodes that are concatenated together. Moreover, in one embodiment, it is contemplated that the network 440 may change the display pipeline 440 every $1/60^{th}$ of a second for example.

In this embodiment, a register DMA controller 442 (alternatively referred to as an "RDC") is illustrated coupled to the network 416 and one or more register update lists 446 (alternatively referred to as an "RUL"). The RDC 442 is adapted to support multiple, configurable pipelines 440 by accessing and fetching (i.e., obtaining) one or more instructions from the RUL 446 and providing such instructions to the display pipeline 440. In one embodiment, the RDC 442 accesses the RUL 446 (fetching the instructions) in response to the one or more trigger signals 444 (real time DMA trigger signals or events generated by the last node in the pipeline 440 for example). It is contemplated that, if the network 416 did not have an RDC 442 associated therewith, the network 416 would have to reconfigure the pipeline one register at a time.

Figure 5:
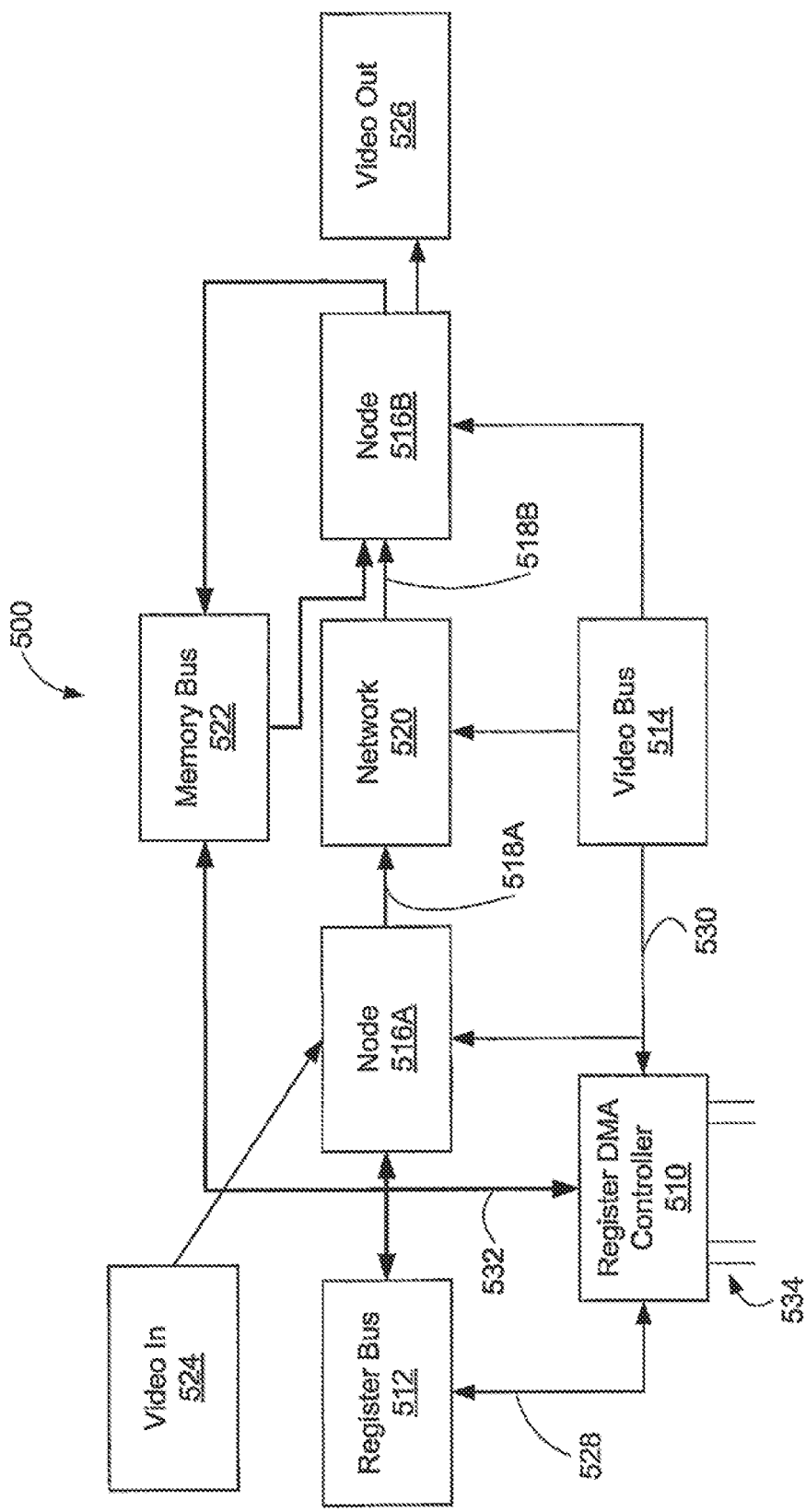
FIG. 5 illustrates one embodiment of a block diagram of a network environment for video processing modules.

FIG. 5 illustrates one embodiment of a block diagram of a network environment (alternatively referred to as a "display engine") for video processing modules in accordance with the present invention. The network, generally designated 500, is adapted to support a pull data scheme and comprises at least a register DMA controller, one or more nodes, one or more links, and one or more network modules. In this embodiment, the register DMA controller 510 (or register DMA controller) is responsible for register access within the system 500. The register DMA controller 510 connects the register bus 512 (alternatively referred to as "RBUS") with the video register bus 514 (alternatively referred to as "VBUS").

The system 500, in one embodiment, further comprises one or more nodes 516 (two nodes 516A & 516B are illustrated). Nodes 516 are modules that process video information (nodes 516A & 516B are illustrated having video-in signals 514 and video-out signals 526 respectively). Some examples of nodes comprise video scalers, 2D graphics compositors, video encoders, etc.

FIG. 5 further illustrates one or more links 518 (links 518A & 518B are illustrated). In this embodiment, the links 518 comprise a set of signals or buses that tie or connect at least two nodes together (link 518A is illustrated coupling node 516A to network module 520 while link 518B is illustrated coupling network module 520 to node 516B). The links 518 are adapted to transfer information using a predefined protocol. More detail about the links is provided in U.S. Provisional Application No. 60/420,347 filed Oct. 22, 2002, titled "Video Bus For a Video Decoding System", the complete subject matter of which is incorporated herein by reference in its entirety.

Additionally, system 500 comprises one or more network modules 520 that, in this embodiment, are specialized nodes that don't perform video processing functions. Rather, the network module 520 connects at least two or more links 518 together, routing information between them. In general, the system 500 may include a number of pipelines (i.e., display pipelines) formed by chaining multiple nodes together. Each pipeline starts at one or more nodes 516, where it is contemplated that each node has a memory interface to a frame buffer (not shown in FIG. 5). Functions are added to the pipeline by cascading more nodes to the pipelines.
Finally, a pipeline ends at one or more nodes, where each such node is a desired output channel.

In accordance with the present invention, the register bus or RBUS 512 is connected to the video register bus or VBUS 514 through the register DMA controller 510. In this embodiment, both buses use identical signaling and protocols. The register DMA controller 510 acts as a slave to the RBUS 512 and forwards all the transactions to VBUS 514. In addition, register DMA controller 510 may perform one or more Register DMA operations, which comprises decoupling a host from video timing by automating mode changes.

In one embodiment, register DMA controller 510 includes four interfaces. There are two register bus interfaces, one interface 528 coupling the register DMA controller 510 to RBUS 512 and the other interface 530 coupling the register DMA controller 510 to VBUS 514. The third interface is a memory bus interface 532 coupling the register DMA controller 510 to the memory bus 522 (alternatively referred to as "MBUS"). The memory bus 522 is used to access register writes from an external memory. Finally the last interface 534 comprises an array of signals coming from at least one of the nodes 516, which are used as DMA triggers.

In accordance with one embodiment, display modes are configured or changed using control registers. Instead of updating the display modes one at a time, the host uses the register DMA controller, feature or operation (alternatively referred to as the register DMA controller in FIG. 5) to automate the process. In this embodiment, the Register DMA comprises three entities: a register update list, a DMA descriptor and a DMA trigger as provided below.

Figure 6:
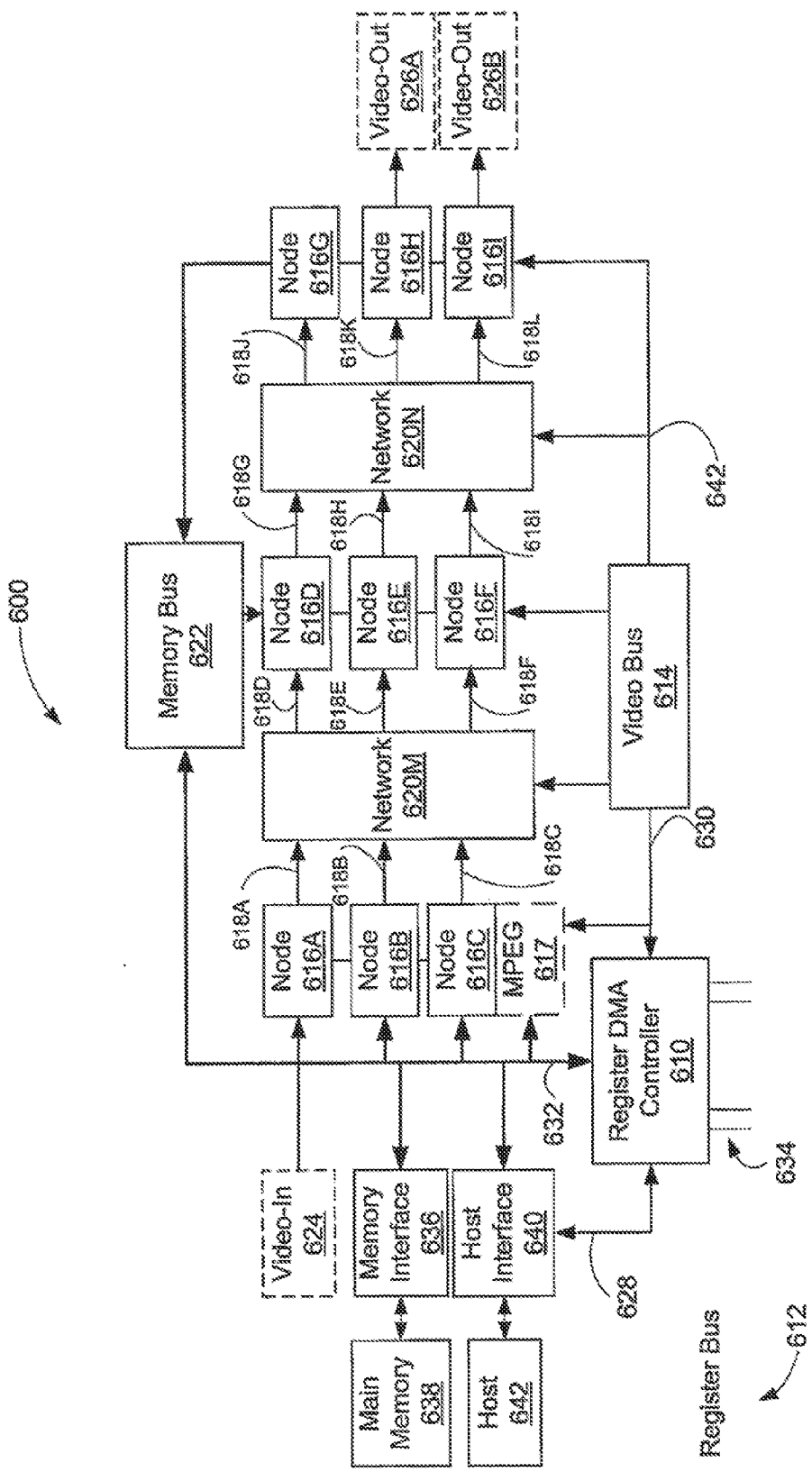
FIG. 6 illustrates another embodiment of a block diagram of a network environment in accordance with the present invention.

FIG. 6 illustrates another embodiment of a block diagram of a network or display engine according to the present invention. In this embodiment, the network, generally designated 600, video processes modules and is further adapted to support a pull data scheme. Register DMA controller 610 is responsible for register accesses within the network 600 (i.e., the register DMA controller 610 is a register DMA). The register DMA controller 610 connects the register bus or RBUS 612 with the video register bus or VBUS 614.

In this embodiment, the RBUS 612 comprises at least one video-in module 624 coupled to and communicating with at least one node (Node 616A for example). Further the RBUS 612 may comprise a memory interface 636 coupled to and communicating with at least the memory bus 622 (using memory bus interface 632 for example) and main memory 638; and a host interface 640 communicating with at least the memory bus 622 (using memory bus interface 632 for example), host 642 and register DMA controller (using interface 628 for example).

The network 600, in this embodiment, comprises a plurality of nodes 616 (nine nodes 616A-616I are illustrated) adapted to process video information. While only nine nodes are illustrated, more (or less) nodes are contemplated. Again, the nodes 616 process video information (node 616A is illustrated having video-in signals 624 communicating therewith, while nodes 616H and 616I are illustrated having video-out signals 626A and 626B respectively communicating therewith). In this embodiment an optional MPEG decoder 617 is illustrated coupled to node 616C, and communicating with video bus 614, register DMA controller 610 and memory bus 622.

FIG. 6 further illustrates a plurality of links 618 (12 links 618A-618L are illustrated). Again, while 12 links 618 are shown, a different number is contemplated. In this embodiment, the links 618 comprise a set of signals or buses that tie at least two nodes 616 together and transfer information using a predefined protocol.

Additionally, network 600 comprises a plurality of specialized nodes or network modules 620 that, in this embodiment, connect at least two or more links 618 together, routing information therebetween. It is again contemplated that, in general, the network 600 may include a number of display pipelines formed by chaining multiple nodes together using the network modules 620 to switch between the nodes 616, thus varying or changing the pipeline. Each pipeline starts and ends at one or more nodes 616, where it is contemplated that each node has a memory interface 636 to a frame buffer. Functions are added to the pipelines by cascading that pipeline with more nodes.

In accordance with the present invention, the RBUS 612 is connected to the VBUS 614 through the register DMA controller 610. In this embodiment, both buses use identical signaling and protocols. The register DMA controller 610 acts as a slave to the RBUS 612 and forwards all the transactions to VBUS 614. In addition, register DMA controller 610 is a Register DMA, decoupling the host from video timing using automating mode changes.

In accordance with one embodiment, one or more modules (nodes for example) process pixels or other data as fast as possible, responding to an incoming accept signal transmitted via the links to stall pixel processing at the current cycle. The modules communicate using a ready-accept protocol transmitted via the links (i.e., a protocol using ready and accept signals alternatively referred to as a handshake protocol). More fully described in U.S. Provisional Application No. 60/420,347 as provided above.

It is contemplated that, in one embodiment, the links contain information that may be used to delineate the start of a line of video information, and the start of a field or frame of video information. StartLine information is active only during the first beat of the first pixel of a line. StartField information indicates the start of a field/frame, or the end of a field or frame. This signal is active only during the first beat of the first pixel of the first line of a field or frame or the first beat of the last pixel of the last line of the field or frame (i.e., end frame). It is contemplated that in this embodiment, unlike other video standards such as Rec656, StartLine and StartField information is not separated by blanking lines or blanking pixels. All blanking information is removed from the data structure of the bus or link.

Essentially, the field of data is sent as a contiguous array of data on the bus, without blank pixels. This removes the strict timing relationship between the arrival time of the StartField on the bus, and the Vertical Sync information defined by NTSC or SMPTE standards. The output module inserts the correct timing information which governs the pull-rate of the data flow across the bus. Further, all modules supply pixel data to the output module at or ahead of the time the pixels are needed. This is governed by the flow control ready/accept signals (i.e., ready-accept protocol).

Figure 7:
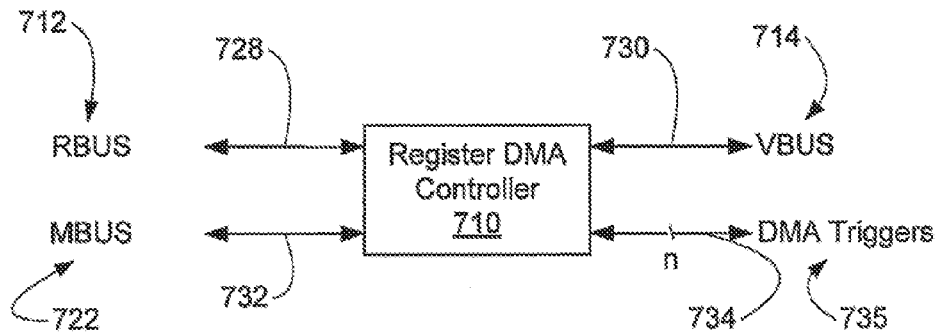
FIG. 7 illustrates one embodiment of a register DMA controller in accordance with one embodiment of the present invention.

FIG. 7 illustrates one embodiment of register DMA controller 710 including four interfaces similar to that provided previously. There are two register bus interfaces, one interface 728 coupling the register DMA controller 710 to RBUS 712 and the other interface 730 coupling the register DMA controller 710 to VBUS 714. The third interface is a memory bus interface 732 coupling the register DMA controller 710 to the memory bus 722. Finally, interface 734 comprises an array of signals (0-n) coupled to at least one of the nodes 716, which are used as DMA triggers, and generally designated 735. More detail about the register DMA controller is provided in U.S. patent application Ser. No. 10/300,370 filed Nov. 20, 2002, titled "Hardware Assisted Format Change Mechanism in a Display Controller", the complete subject matter of which is incorporated herein by reference in its entirety.

Figure 8:
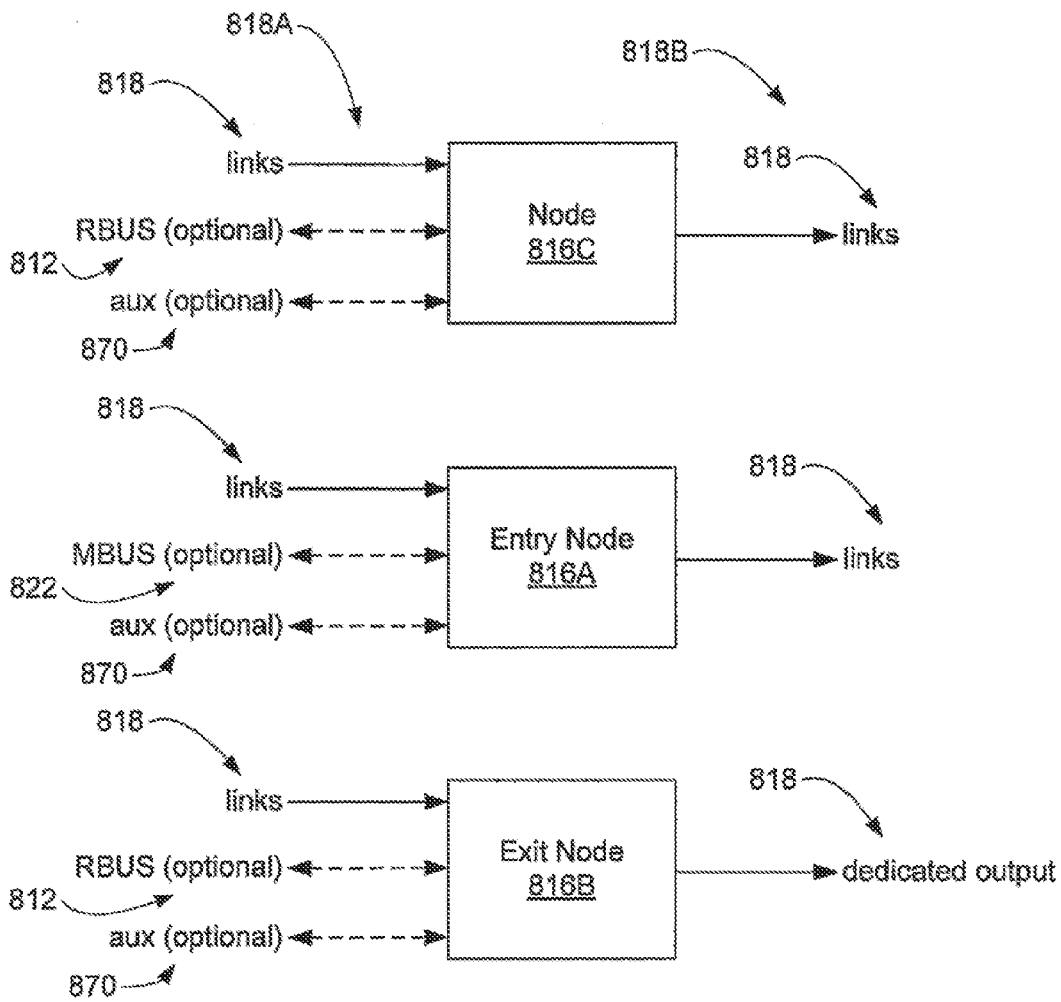
FIG. 8 illustrates embodiments of block diagrams of nodes in accordance with the present invention.

FIG. 8 illustrates different embodiments of the nodes, generally designated 816, used in one embodiment of the network. The network, in accordance with the present invention, is adapted to perform video processing functions similar to a display engine, including video playback, scaling, encoding, etc. It is contemplated that each node 816 in the network may be generally divided into three categories according to its position in a display pipeline: entry, exit, and intermediate. Video data enters a display pipeline at an "entry node" designated 816A and leaves at an "exit node" designated 816B. All the nodes in-between are referred to as "intermediate nodes" or "nodes" designated 816C. Examples of entry nodes 816A include MPEG display feeders, playback engines, etc. Examples of exit nodes 816B include video encoders, capture engines, etc. Examples of intermediate nodes 816C include scalers, compositors, etc. It is further contemplated that the position of each node in the pipeline configuration is not fixed; rather its position varies depending on the display pipeline (i.e., an entry node in one pipeline may be an intermediate node in another display pipeline).

As illustrated, the nodes 816 each generally include at least one input and output interface or link 818 communicating therewith. It is contemplated however that each node 816 is adapted to have multiple input or output links 818A & 818B coupled thereto and communicating therewith (a compositor for example has multiple input links). Furthermore, each node 816 may also have an optional RBUS 814, MBUS 822 or some other optional auxiliary interface 880 (a DMA trigger for the register DMA controller for example) communicating therewith. If the node 816 is an entry node 816A, it is contemplated that the input link is an MBUS interface 822 as illustrated. For exit nodes 816B, the output is replaced by a dedicated output 850 (e.g., a memory interface for a capture engine or an analog video output for a video encoder).

As provided previously, a display pipeline in the network starts or begins at one or more entry nodes 816A. The entry node 816A is responsible for feeding video to the downstream nodes 816 and includes, for example, MPEG display feeders and playback engines. In one embodiment, the input to an entry node 816A may comprise RBUS and memory interfaces. Its output may comprise one or more output links 818B. In addition, the entry node 816A may include one or more auxiliary interfaces 870 such as a DMA trigger for the register register DMA controller.

The intermediate node 816C, in one embodiment, may have specific functions comprising scaling, compositing, etc. One or more nodes are added to a display pipeline as its features are used to satisfy certain output requirement. In general, the input and output of an intermediate node 816C comprises one or more links 818A & 818B as provided previously. In addition, the intermediate node 816C may have an optional register bus interface or some other auxiliary interface 870 coupled thereto and communicating therewith.

As provided previously, the display pipeline ends at exit node 816B, which may comprise a video interface such as a composite signal encoder or capture engine for example. In general, the inputs to an exit node 816B consist of an input link 818, an optional register bus 812, and a video output or a memory bus interface 870.

In addition to the functions described previously, the exit nodes 816B may include some debugging functions. For example, a checkpoint register may be written into control packets and read by the register bus 812. This register is programmed in every field to a field dependent number. At the same time, a host may check the progress of the video packets by monitoring this register through the register bus 812.

It is contemplated that exemplary embodiments of the nodes 812 should meet certain requirements in order to maintain intra- and inter-packet synchronization. For example, nodes should be adapted to forward incoming control packets without being modified. If the node is a multi-input node, one particular input may be designated as the primary link, such that the control packets of the primary links are forwarded, while control packets from other inputs are terminated.

It is contemplated that exemplary nodes 816 process and output packets in their arriving order. If the node is a multi-input node, it may only operate on packets corresponding to the same field in time. For example, if the node 816 is a graphics compositor, the i-th field of one input may be combined with the i-th field of another input. If the active input is not receiving any data, other inputs and the outputs may be stalled.

If the exemplary node 816 is a multi-output node, control and video packets may be forwarded to all the output links. Stalling by one of the output links stalls the inputs as well as the other outputs. Unused input or output links of such exemplary nodes 816 may be disabled using RBUS 812 and the control register. The disabled link may be excluded from controlling other inputs or outputs. For a pipelined node, the next field's control packet should not have any effect on current field's video packet.

Figure 9:
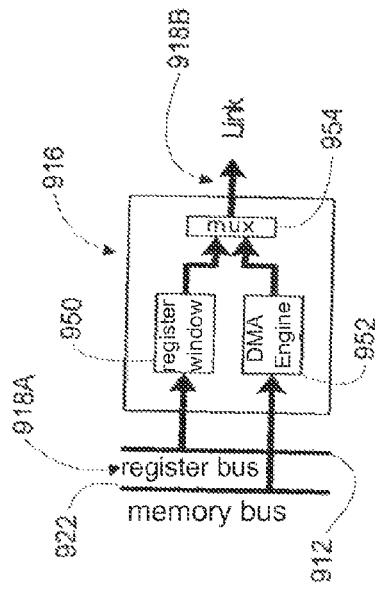
FIG. 9 illustrates one embodiment of an entry node in accordance with one embodiment of the present invention.

Another embodiment of an entry node, generally designated 916, is illustrated in FIG. 9. It is contemplated that the entry node 916, in addition to having input links 918A (comprising RBUS 912 and MBUS 922) and output link 918B, may include an optional register referred to as a "register window" generally designated 950. In one embodiment, the register window 950 is adapted to insert control packets into the output link 918B (using DMA engine 952 and mux 954). In this embodiment, a write to a specific location outputs a 32-bit control word.

Figure 10:
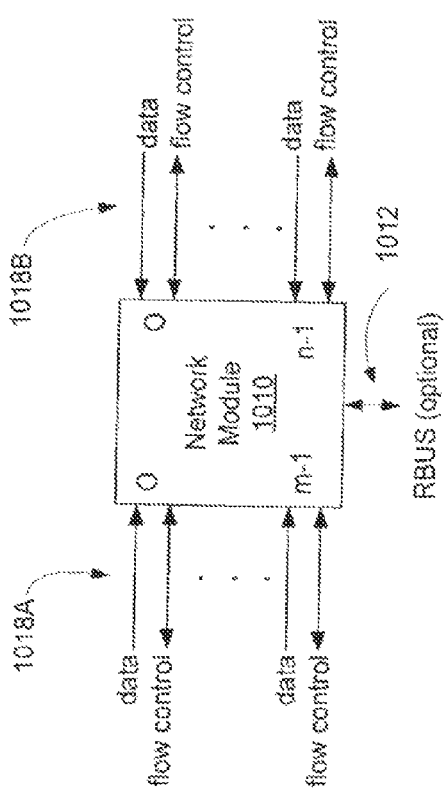
FIG. 10 illustrates one embodiment of a network module in accordance with one embodiment of the present invention.

FIG. 10 illustrates one embodiment of a network module 1020 in accordance with the present invention. In this embodiment, the network module 1020 comprises a plurality of network interfaces or links generally designated 1018 and switches, described in greater detail below. In this invention, one or more network modules are used to connect one or more nodes, forming a display pipeline. Since the nodes may be re-configured, it is contemplated that display pipelines having different functionality may be implemented for different applications. In other words, the display pipelines are dynamic and not static.

The network interfaces 1018, in this embodiment, comprise input and output links 1018A & 1018B respectively, and an optional register bus 1012. In this embodiment, m input links 1018A and n output links 1018B are illustrated, where m and n may be the same or different. It is contemplated that m may be greater than, equal to or less than n (i.e., the number of input links 1018A may be greater than, equal to or less than the number of output links 1018B).

It is contemplated that different types of network modules may be used within the register DMA controller or display engine. The network module 1020, in accordance with the present invention, is comprised of an array of switches coupled together using predefined topology. This topology determines the network module's routing capabilities, as well as the implementation cost.

In accordance with the present invention, a multi-stage network module may comprises at least one 2×2 switch box 1121 as illustrated in FIG. 11A. Although a 2×2 switchbox is discussed, other switches are contemplated. Each switch box 1121 is, in this embodiment, a two-input two-output interchange device. The switch box has four functions as illustrated: straight, designated 1170A; exchange, designated 1170B; upper broadcast, designated 1170C; and lower broadcast, designated 1170D. For bijections interchanges (i.e., one-to-one connections) such broadcast functions are not used.

It is contemplated that, in the present invention, multiple switch boxes may be coupled together to form a subset of multi-stage network modules. As illustrated in FIG. 11B, a single stage shuffle-exchange network module, generally designated 1101, may be formed by connecting or coupling N/2 switch boxes 1121 (where N equals the number of inputs) after a hardwired shuffle function 1172. The shuffle function 1172 is, in this embodiment, a single bit rotation of a network address. The switch boxes 1121 perform an exchange function 1174, which is a single bit negation of a network address.

FIG. 11C illustrates an example of an N×N Omega network module, generally designated 1123, formed by cascading log(N) stages of shuffle-exchange network modules 1101 as illustrated in FIG. 11B. As a result, such network module 1123 has a complexity of O(N log(N)).

Figure 11D:
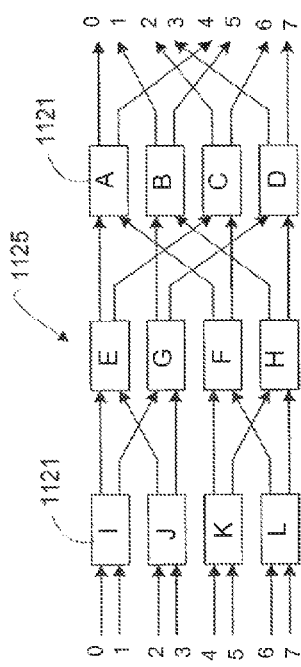
Figure 11E:
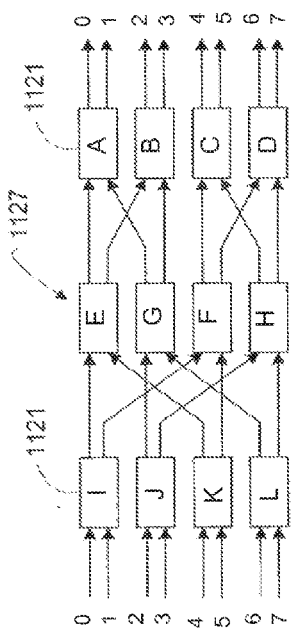
Figure 11F:
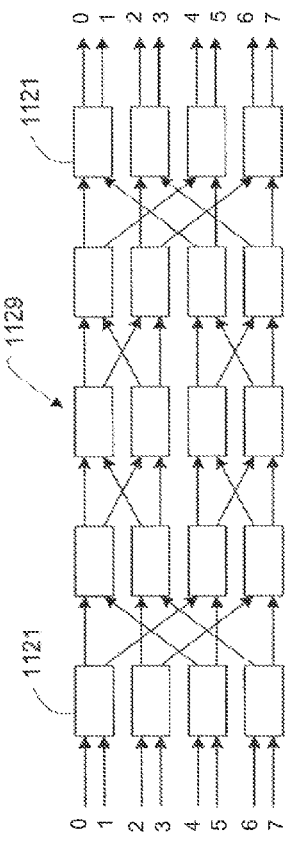

Other networks having topologies similar to the network module 1123 of FIG. 11C are illustrated in FIGS. 11D-11F. For example, an n-cube network 1125 illustrated in FIG. 11D may be formed from an network module 1123 by reversing the signal direction and swapping the middle two switch boxes 1121 (switch boxes 1121F and 1121G for example) in the second stage. In one embodiment, the n-cube network 1125 uses only two-function switch boxes instead of four-function switch boxes used in the network module 1123.

The n-cube network 1125 of FIG. 11D may be converted to another type of network module referred to as a butterfly network module generally designated 1127 and illustrated in FIG. 11E. This butterfly network module 1127 may be formed from an n-cube network 1125 by swapping the first two shuffle functions and replacing the last shuffle function by re-mapping the network addresses.

It is contemplated that the multi-stage shuffle exchange network modules provided previously are adapted to provide connections from any input to any output at a very low cost. However, such multi-stage shuffle network modules are considered blocking networks. Simultaneous connections of more than one input/output pair may result in conflicts in the links and switches. For example, in the network module 1123 illustrated in FIG. 11C, connections from 5 to 0 and 7 to 1 may not be established simultaneously.

FIG. 11F illustrates a variation of the butterfly network 1127 of 11E and referred to as the Beneš network module, generally designated 1129. In the illustrated embodiment, the N×N Beneš network module 1129 comprises 2 log(N)−1 levels. The first and last log(N) levels comprise two butterfly network modules, where the middle level is shared between the two butterflies. The Beneš network module 1129 is a rearrangeable network module. However, it is contemplated that any new connections in the Beneš network module may require a complete reordering of the internal connections.

Figure 11G:
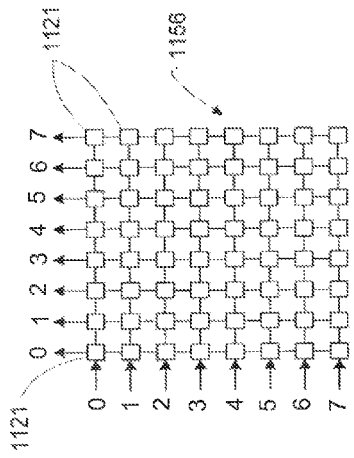

FIG. 11G illustrates a crossbar network module 1156, comprising a plurality of switches 1121, similar to the crossbar switches provided previously. In this embodiment, the crossbar network module 1156 is a non-blocking network, adapted to handle all possible connections without blocking. This enables the network to map any input to any output. Furthermore, a connection may be set up or torn down dynamically without affecting the existing connections. In one embodiment, the switch boxes 1121 in the crossbar network module 1156 are different from those provided previously, representing a tap from the horizontal data bus to the vertical data bus.

Figure 12:
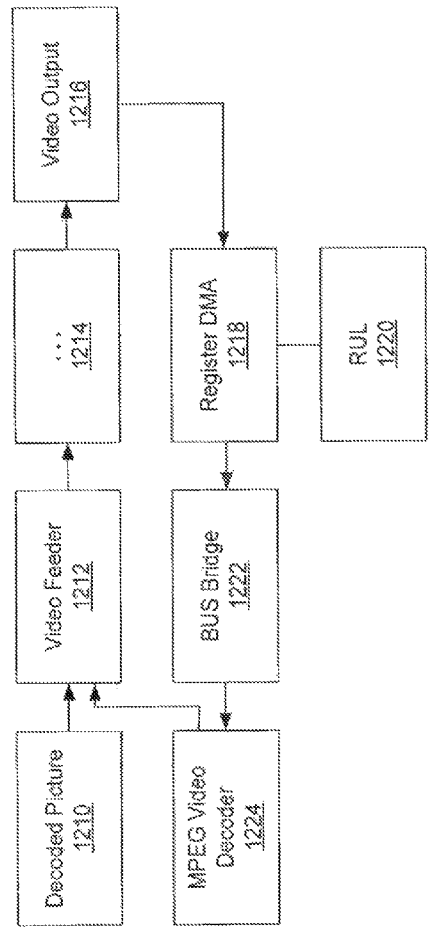
FIG. 12 illustrates one embodiment of a programming model in accordance with one embodiment of the present invention.

It is contemplated that one or more embodiments of the present invention are adapted to provide at least one display pipeline of a plurality of display pipelines having a data rate different from at least one other display pipeline of the plurality of display pipelines. It is also contemplated that at least one display pipeline of a plurality of display pipelines may have a data rate that is independent of at least one other display pipeline of the plurality of display pipelines (using a flow control valve for example). FIG. 12 illustrates one embodiment of a block diagram of a programming model using an entry node 1212 (a video feeder for example) similar to the entry nodes provided previously. The video feeder or entry node 1212 is adapted to fetch or capture a decoded picture 1210 from a frame pipeline and feed it to the display pipeline. In this embodiment, it is contemplated that the MPEG video decoder 1224 is a TITAN decoder, although other decoders are contemplated (an MVP examples of which are described in U.S. patent application Ser. No. 10/114,798 filed Apr. 1, 2002, titled "Video Decoding System Supporting Multiple Standards" incorporated herein by reference in its entirety.

As illustrated, the register DMA unit 1218 is connected to at least some registers shared with the TITAN decoder or other video decoder 1224 through bus register DMA controller 1222. The register DMA 1218 is adapted to fetch one or more predefined RULs 1220 from the main memory. One of these entries may be written to the video decoder or TITAN decoder's share register, which is used to notify the MPEG decoder 1224 about the end of the picture. In this embodiment, the video output 1216, coupled to the display pipeline 1214, may comprise a video encoder or capture engine for example. The video output 1216 is adapted to generate one or more DMA trigger signals tied to the register DMA 1218.

Figure 13:
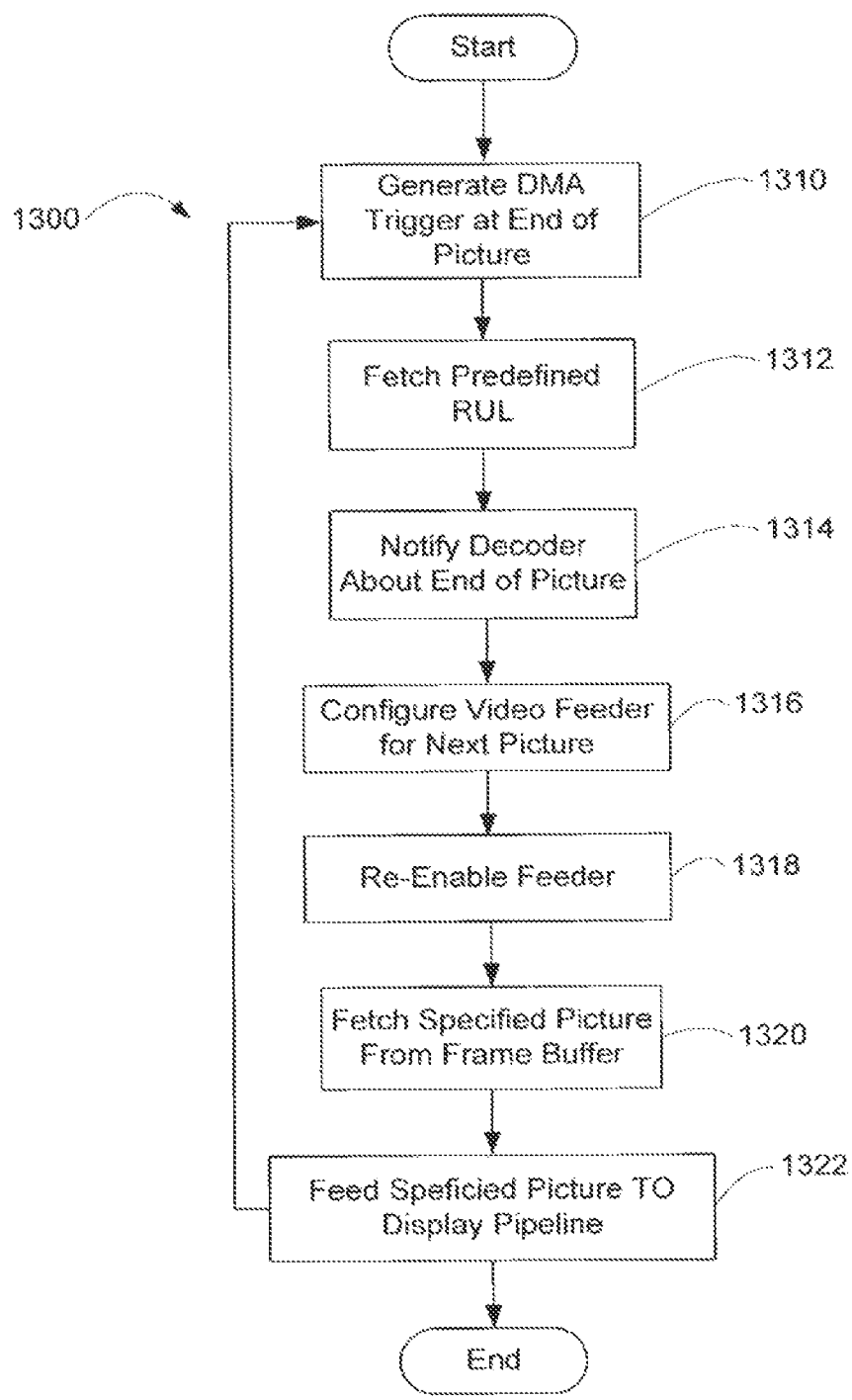
FIG. 13 illustrates one embodiment of a high level flow chart of a programmable method using at least one node in accordance with one embodiment of the present invention.

FIG. 13 illustrates one embodiment of a high level flowchart of a method of programming an A/V system (an A/V system having a network for example) using at least one node (entry node or video feeder for example) in accordance with the present invention. In this embodiment, during a frame or field time, the video output generates at least one DMA trigger at the end of a first picture as illustrated by block 1310. In this embodiment the DMA trigger is communicated to the register DMA unit. The register DMA unit fetches or obtains at least one predefined RUL from the main memory (not shown) as illustrated by block 1312. One of the RUL entries is written to the video decoder share register, which is used to notify the video decoder about the end of the picture as illustrated by block 1314.

After the video feeder is configured for the next picture as illustrated by block 1316, the video decoder re-enables the video feeder as illustrated by block 1318. It is contemplated that, if the video feeder is double buffered, the video decoder may re-enable the video feeder before the end of the picture. The video feeder fetches or obtains a second or next picture from a frame buffer as illustrated by block 1320. The video feeder 1312 feeds at least the second picture to the display pipeline as illustrated by block 1322. It is contemplated that this programming method may end or repeat for one or more pictures.

In accordance with the present invention, control registers are utilized to set up the network module routing. Two types of control structures (i.e., individual stage control and individual box control) are discussed with respect to setting up or establishing such network module routing, although other control structures are contemplated. In individual stage control, the same register is used to set up all switch boxes within the same stage. In other words, all the switch boxes assume the same state. This simplifies the control design but may be considered inflexible. In individual box control, each switch box may be configured independently. This independent configuration generally requires more hardware when compared to the individual stage control, but it offers greater flexibility.

In addition to the two types of control structures, three methods for configuring network modules are discussed, although other methods are contemplated. One method to configure a network module comprises using an asynchronous control scheme, which is considered the simplest of the three. The switch boxes of the network module may be configured directly using the register bus by packing their control signals into a number of registers. The host may set up or tear down connections by programming different values into these registers. However, as the register writes are asynchronous to video timing, such register writes have to be handled carefully to avoid interrupting the display. In a non-blocking network module, this may be accomplished using a Register DMA. In a blocking or rearrangeable network module, additional buffering may be used at the network modules' outputs in order to accommodate the pipeline bubbles created during the reconfiguration.

Another method for configuring network modules comprises semi-synchronous control, which is an extension of the asynchronous control scheme discussed previously. This extension may be accomplished using double buffering and a trigger mask. Firstly, semi-synchronous control double buffers all the switch box control registers. The front registers control the switch boxes while the back registers are programmed by the host. The front registers are updated by the back registers when a force update bit is set or a trigger signal is generated by the trigger mask.

Secondly, the semi-synchronous control method uses a trigger mask. In this embodiment, the trigger mask contains an array of bits, each bit corresponding to an input port of the network. A trigger is generated at the end of a video stream for which the mask bit is set. During initialization, the host uses a force update bit to program the network module. Afterward, the host reconfigures the network module by programming the back registers and setting a mask bit accordingly. At the end of the video stream corresponding to the mask bit, the network is automatically reconfigured. One benefit associated with such exemplary semi-synchronous control method is that reconfiguration may be automatically synchronized to video timing.

Another method for configuring network modules comprises synchronous control. This method requires that the network connections be changed synchronously with video streams. Such synchronization may be achieved using control packets to configure the network modules. The network module creates a connection using the control packets, forwarding subsequence packets according to the resulting route. If a packet is forwarded to an occupied output link, the packet is stalled until that link is free.

In accordance with one embodiment of the present invention, the network carefully accommodates format changes for the display engine, as even a slight mistake may be noticeable on a display. In accordance with one embodiment of the present invention, control registers are used to set one or more nodes in the network. Three methods for implementing the control registers are discussed, although other methods are contemplated. One method, referred to as "single buffering", relies on the fact that the values of some control registers are designated "don't care" during certain periods of time during the transmission (e.g., vertical blanking). These registers may be modified freely during such period without any damaging effect.

Another method for implementing the control registers comprises using double buffering, which may be implemented using a pair of front (i.e., "current") and back (i.e., "next") registers. The front register provides the current control information while the back register may be updated in the background. A properly timed signal is used to copy the content of the back register to the front register. This method may be used in situations where the window for register updating is small or the control doesn't allow any slack for a format change.

Yet another method for implementing control registers comprises an inband control method, wherein control information is embedded within the data stream, such that the control information and the data stream share a single path. This method r utilizes synchronization between the control information and the data stream. It is contemplated that, in this method, format changes may be performed rapidly, even in a heavily pipelined design. This method is well suited for high performance designs such as 3D graphics processors.

Figure 14:
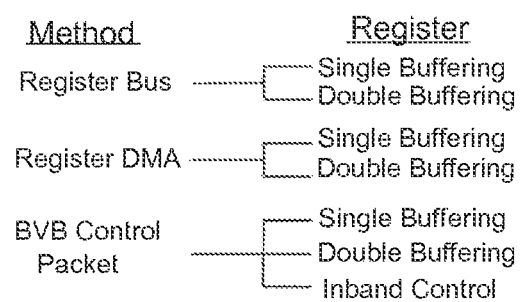
FIG. 14 illustrates three methods used to write or implement control registers in accordance with one embodiment of the present invention.

FIG. 14 illustrates the three methods (i.e., Register bus, Register DMA, and control packets) used to write or implement control registers in accordance with the present invention. Each of these method supports certain types of control register. While only three methods are discussed and illustrated, other methods are contemplated.

One method for writing or implementing control registers comprises using the register bus and supports single and double buffering. The host uses the register bus to directly program the control registers. The host further controls the write timing and ordering. In one embodiment, double buffering may be used to decouple the host from the video timing. However, since the registers are written one at a time using a relatively slow interface (i.e., the register bus), the process may be considered time consuming in comparison to the other methods.

Another method for writing or implementing control registers comprises using the register DMA and supports single and double buffering. The register DMA automates the register programming. The register DMA controller is used to stream predefined lists of register write into the display engine through the register bus. The write timing is controlled by the triggering signals generated by various nodes, thus the real-time requirement on the host is relaxed. In addition, this method may potentially eliminate most double buffering.

Yet another method for writing or implementing control registers comprises using control packets and supports all three control register types. A control packet may be fed into an entry node's register window using a register DMA. Using the control packets with single and double buffered control registers provides benefits similar to those provided by the Register DMA. The control packet may enable rapid format changes or inband control. However, such rapid format changes require extensive control register staging. Furthermore, such rapid format changes aren't used in video processing applications, as a format changes occur, at most, once per field.

It is contemplated that the Register DMA in accordance with the present invention may be an exemplary method used to implement format change. However, it is contemplated that the register bus may be used to handle simpler or ad hoc control register accesses, while control packets may be used as a complement to these methods in limited situations.

A flow control valve is used, in one embodiment of the invention, as a device to control data flow in a display engine. It is contemplated that such flow control valve or module may provide for independent data flow rates on one, two more display pipelines, and enable one or more display pipelines having different and/or independent data rates. The flow control valve sequences video data and controls information inside the display engine. Such valve acts primarily by stalling and restarting the flow control signals of at least one link. An exemplary flow control valve maintains synchronization between video and control with minimum effort. Four flow control valve modes (i.e., Manual On Manual Off, Manual On Auto Off, Auto On Manual Off and Auto On Auto Off) are discussed, although other modes are contemplated.

The Manual On Manual Off type of flow control valve may be turned on and off by writing to the valve's control register. The Manual On Auto Off type of flow control valve is turned on manually. However, the type of flow valve senses a trigger signal to shut itself off, where the signal may be an external signal or a bit from the content of a link (e.g., an end of field signal).

The Auto On Manual Off type of flow control valve is the opposite of the Manual On Auto Off type of flow control valve. However, in this embodiment, the Auto On Manual Off type of flow control valve uses an external trigger signal. The Auto On Auto Off type of flow control valve uses two trigger signal inputs: trigger on and trigger off.

In general, the front-end of a video decoder is responsible for producing pictures while the display engine consumes them. A frame buffer may be placed between the video decoder and the display engine as an intermediate storage.

However, it is contemplated that modern display engines may incorporate one or more front-end like features (compositing, graphics overlaying, windowing for example). These features are included in the display engine to eliminate the memory bandwidth required for handling the intermediate results. In accordance with one embodiment of the present invention, it is possible to perform multi-pass operations using a display engine by capturing its output in a frame buffer (for example to down scale a picture for PIP displaying or for non real-time compositing of a complicated graphics background). In addition, using multi-pass operation on a network (taking advantage of the flow control architecture of the network) in accordance with one embodiment of the present invention enables a data throughput greater than the video rate. As a result, some functions may be shared or reused between different video streams. More detail about the multi-pass operations is disclosed is provided in U.S. Provisional Application No. 60/420,308 filed Oct. 22, 2002, titled "Multi-Pass System and Method Supporting Multiple Streams of Video", incorporated herein by reference in its entirety.

Many modifications and variations of the present invention are possible in light of the above teachings. Thus, it is to be understood that, within the scope of the appended claims, the invention may be practiced otherwise than as described hereinabove.

We claim:

1. A system for processing data, comprising:
a flow control module configured to control a rate of data flow in display pipelines; and
at least one system time reference recovery device configured to determine a timing reference of at least one input data stream;
wherein the flow control module is operable to enable different data flow rates for different display pipelines corresponding to a timing reference determined for each of the at least one input data stream.

2. The system of claim 1, further comprising multiple nodes configurable to form the different display pipelines by varying respective positions of the multiple nodes within the different display pipelines.

3. The system of claim 1, wherein a particular node is assigned a starting position within a first display pipeline and is assigned a non-starting position within a second display pipeline, wherein the different display pipelines comprise the first display pipeline and the second display pipeline.

4. The system of claim 1, further comprising a control register of the flow control module that is operable to activate the flow control module by writing a control value to the control register.

5. The system of claim 1, further comprising a frame buffer that is operable to capture an output of a first display pipeline, wherein the different display pipelines comprise the first display pipeline.

6. The system of claim 5, wherein the frame buffer is operable to input content of the frame buffer to a second display pipeline, wherein the different display pipelines comprise the second display pipeline.

7. The system of claim 1, further comprising a controller configured to form at least one display pipeline by dynamically selecting use of at least two selectable nodes from a plurality of selectable nodes and dynamically concatenating the selected at least two selectable nodes together.

8. The system of claim 7, wherein the controller changes a functionality of the at least one display pipeline by dynamically concatenating more than two nodes together.

9. The system of claim 7, wherein the controller is a register DMA controller configured to support register access.

10. The system of claim 9, wherein the register DMA controller is further configured to provide at least one instruction to form the display pipeline.

11. The system of claim 9, wherein the register DMA controller is further configured to obtain at least one instruction from a register update list.

12. A method comprising:
controlling a rate of data flow in display pipelines;
determining a timing reference of at least one input data stream; and
configuring multiple nodes from a first display pipeline to a second display pipeline by varying respective positions of the multiple nodes within the first and second display pipelines,
wherein different data flow rates are enabled for the first and second display pipelines corresponding to a timing reference determined for each of the at least one input data stream.

13. The method of claim 12, further comprising forming the first and second display pipelines by varying respective positions of multiple nodes within the first and second display pipelines.

14. The method of claim 12, wherein a particular node is assigned a starting position within the first display pipeline and is assigned a non-starting position within the second display pipeline.

15. The method of claim 12, further comprising changing a flow rate associated with a particular display pipeline by writing a control value to a control register.

16. The method of claim 12, further comprising capturing an output of the first display pipeline to a frame buffer and feeding a content of the frame buffer to the second display pipeline.

17. The method of claim 12, wherein the second display pipeline is formed by dynamically selecting use of at least two selectable nodes from a plurality of selectable nodes and dynamically concatenating the selected at least two selectable nodes together.

18. The method of claim 17, further comprising changing a functionality of the second display pipeline by dynamically concatenating more than two nodes together.

19. The method of claim 12, further comprising:
obtaining at least one register update list from a main memory in response to receiving at least one trigger; and
writing a register update entry from the register update list to a register of a decoder, wherein the register update list stores instructions for configuring a display pipeline.

20. The method of claim 19, wherein the register update list stores multiple instructions for updating multiple nodes of a display pipeline concurrently.

* * * * *